United States Patent

Saam et al.

[15] 3,665,052
[45] May 23, 1972

[54] METHOD OF PREPARING A BLOCK COPOLYMER CONTAINING A POLY-ALPHA-METHYLSTYRENE BLOCK AND A POLYDIORGANOSILOXANE BLOCK

[72] Inventors: John C. Saam; Frederick W. G. Fearon, both of Midland, Mich.

[73] Assignee: Dow Corning Corporation, Midland, Mich.

[22] Filed: Aug. 25, 1970

[21] Appl. No.: 66,891

[52] U.S. Cl. .................. 260/827, 260/23.7 M, 260/33.6 SB, 260/93.5 S, 260/886
[51] Int. Cl. ...................................... C08g 47/10, C08f 33/08
[58] Field of Search .......................................... 260/827, 886

[56] References Cited

UNITED STATES PATENTS

| 3,483,270 | 12/1969 | Bostick | 260/827 |
| 3,576,904 | 4/1971 | Saam et al. | 260/827 |
| 3,070,574 | 12/1962 | Kastning et al. | 260/886 |
| 3,187,031 | 6/1965 | Weyenberg | 260/827 |
| 3,187,032 | 6/1965 | Weyenberg | 260/827 |

*Primary Examiner*—Samuel H. Blech
*Attorney*—Robert F. Fleming, Jr., Laurence R. Hobey, Harry D. Dingman, Howard W. Hermann and Roger H. Borrousch

[57] ABSTRACT

Block copolymers containing a poly-alpha-methylstyrene block and a polydiorganosiloxane block are prepared by polymerizing alpha-methylstyrene with a lithium initiator at about −70° C., a small amount of styrene is then added and polymerized onto the poly-alpha-methylstyrene before the temperature is raised to ambient temperature to polymerize polydiorganocyclosiloxanes and forming a block copolymer having the stated blocks. The block copolymers can vary from thermoplastic materials to elastomers.

1 Claim, No Drawings

METHOD OF PREPARING A BLOCK COPOLYMER CONTAINING A POLY-ALPHA-METHYLSTYRENE BLOCK AND A POLYDIORGANOSILOXANE BLOCK

This invention relates to a method of preparing block copolymers and to the block copolymers prepared thereby. More specifically, the block copolymers contain a block of poly-alpha-methylstyrene and a block of polydiorganosiloxane.

Block copolymers containing a block of polystyrene and a block of polydiorganosiloxane have been prepared, however, a block copolymer cannot readily be prepared by merely substituting alpha-methyl-styrene for styrene. When styrene is polymerized with a lithium initiator, the resulting lithium ended polystyrene is stable up to at least 50° C. When alpha-methyl-styrene is polymerized with a lithium initiator, the resulting lithium end poly-alpha-methylstyrene begins to depolymerize at −40° C. and higher temperatures. The lithium ended poly-alpha-methylstyrene is rather inactive toward polydiorganocyclosiloxanes at temperatures below −40° C. and therefore attempts to produce a block copolymer having poly-alpha-methylstyrene blocks and polydiorganosiloxane blocks results in the depolymerization of the poly-alpha-methylstyrene instead of formation of a block copolymer.

It is therefore an object of the present invention to provide a method for preparing a block copolymer containing a block of poly-alpha-methylstyrene and a block of polydiorganosiloxane. Still a further object of the present invention is to provide a block copolymer containing a block of poly-alpha-methyl-styrene and a block of polydiorganosiloxane.

This invention relates to a method for preparing a block copolymer consisting essentially of at least one block of a poly-alpha-methylstyrene and at least one block of a polydiorganosiloxane consisting essentially of (A) mixing under conditions excluding oxygen, water and acidic materials at a temperature below −40° C. and above the freezing point of an ether solution of (1) alpha-methylstyrene and (2) an organolithium compound of the formula $RLi_a$ in which R is a radical selected from the group consisting of monovalent hydrocarbon radicals having from 1 to 30 inclusive carbon atoms and divalent hydrocarbon radicals both having from 2 to 30 inclusive carbon atoms and $a$ being 1 when R is monovalent and 2 when R is divalent, said mixing of (1) and (2) being in the presence of at least 70 weight percent organic ether solvent based on the total weight of the solution, (B) maintaining the resulting mixture of (A) at a temperature below −40° C. and above the freezing point temperature until the alpha-methylstyrene has polymerized, (C) adding to the polymerized alpha-methylstyrene formed in (B) from 0.05 to 0.25 times the moles of alpha-methylstyrene of styrene while maintaining the temperature below −40° C. and above the freezing point temperature of the solution until the styrene has polymerized, thereafter (D) increasing the temperature to a temperature above −40° C. and below the boiling point temperature of the solution, (E) mixing under conditions excluding oxygen, water and acidic materials, (3) a cyclotrisiloxane of the formula $(R^2R^3SiO)_3$ in which each $R^2$ and each $R^3$ is selected from the group consisting of an alkyl radical, an alkenyl radical, an aryl radical and a beta-perfluoroalkylethyl radical and (4) a hydrocarbon solvent wherein the hydrocarbon solvent is present in sufficient quantity to provide a mixture of at least 50 weight percent of (4) based on the total weight of (3) and (4), (F) adding the mixture from (E) to the resulting product from (D) without exposing any of the mixture to oxygen, water or acidic materials, (G) maintaining the resulting mixture from (F) at a temperature above −40° C. and no greater than the reflux temperature of the mixture for at least 30 minutes and until the color of the mixture disappears and the cyclotrisiloxane has polymerized, thereafter, (H) adding a compound selected from the group consisting of acetic acid and $ZR_2^4SiCl$ wherein each $R^4$ and each Z is a monovalent radical defined by $R^2$, $R^3$, or hydrolyzable radical in an amount sufficient or provide at least one molecule of compound per lithium atom of the mixture, (I) recovering a block copolymer containing at least one organic block of $-CH_2-C(CH_3)(C_6H_5)$ — units linked together and having bonded to at least one end of the linked $-CH_2C(CH_3)(C_6H_5)$ — units, units of $-CH_2CH)C_{65})$ — linked together and not more than one end being terminated by R— groups defined above and at least one polydiorganosiloxane block of $-R^2R^3SiO$ — units linked together through silicon-oxygen-silicon bonds and said polydiorganosiloxane being bonded to the $-CH_2CH(C_6H_5)$ — units of the organic block through a silicon-carbon bond and any terminal groups on the polydiorganosiloxane block being selected from the group consisting of a hydroxyl radical and a $-SiR_2^4Z$ radical, there being in said block copolymer an average of from 20 to 5000 $-CH_2-C(CH_3)(C_6H_5)$ — units per organic block, an average from 1 to 1250 $-CH_2CH(C_6H_5)$ — units per organic block and an average of from 20 to 5,000 $-R^2R^3SiO$ — units per polydiorganosiloxane block and said block copolymer having a molecular weight above 7000 and from 5 to 95 weight percent being silicon containing units and 5 to 95 weight percent being units of the organic block.

In the method of the present invention alphamethylstyrene is polymerized in an ether solution excluding oxygen, water and acidic materials at a temperature below −40° C. and above the freezing point of the ether solution with an organolithium compound of the formula $RLi_a$. The ethers suitable for use in the present invention must be liquid below −40° C. Such ethers include, among others, diethyl ether, ethylpropyl ether, dipropyl ether, diisopropyl ether, butylethyl ether, tert.-butylethyl ether, butyl-methyl ether, tert.-butyl-methyl ether, cyclohexylmethyl ether, dibutyl ether, dimethyl ether, dipentyl ether, tetrahydrofuran, resorcinol dimethyl ether, methoxy cyclopropane, 1,3-dioxane, and 1,2-dimethoxyethane. The ethers suitable for the present invention are nonreactive with the alpha-methylstyrene and the organolithium compounds. The reaction between the organolithium compound and alpha-methylstyrene should be carried out under conditions free from contamination, such as water, air, oxygen, inhibitors, acidic impurities, greases and the like. The reaction is preferably carried out below −50° C. to prevent any polymerized alpha-methylstyrene from depolymerizing. The amount of organolithium compound used per amount of alpha-methylstyrene will determine the size of the organic block. The smaller the amount of organolithium compound per given amount of alpha-methylstyrene, the greater the number of alpha-methylstyrene units per block in the resulting polymer. The amount of the organic ether is such that at least 70 weight percent of the solution is either, preferably at least 80 weight percent of the solution is ether, being based on the total weight of the solution.

The mixture of the alpha-methylstyrene and the organolithium compound in ether solution is maintained at a temperature below −40° C., and preferably below −50° C., and above the freezing point of the mixture until the alpha-methylstyrene has disappeared forming a polymer. The reaction product from the reaction of the organolithium compound and alpha-methylstyrene is a lithium terminated polymer having a formula

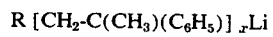

when $a$ is 1 and having a formula

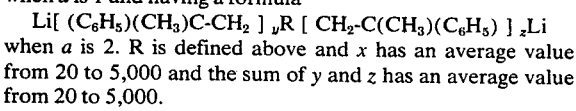

when $a$ is 2. R is defined above and $x$ has an average value from 20 to 5,000 and the sum of $y$ and $z$ has an average value from 20 to 5,000.

While maintaining the temperature of the above ether solution of the lithium terminated poly-alpha-methylstyrene below −40° C. and above the freezing point temperature of the solution, styrene is added in the amount of 0.05 to 0.25 times the moles of alpha-methylstyrene polymerized. The product resulting from this polymerization would have a formula

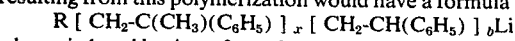

when a is 1 and having a formula

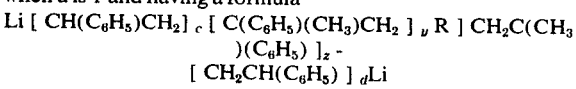

when $a$ is 2. R, $x$, $y$ and $z$ are defined above, and $b$ has an average value from 1 to 1,250 inclusive and the sum of $c$ and $d$ has an average value from 2 to 1,250 inclusive.

After the styrene has polymerized, the temperature of the solution is increased above −40° C., to a temperature between −40° C. and the boiling point of the solution. When the solution has reached the desirable polymerization temperature for the next step, preferably 25° to 50° C., a mixture of a cyclotrisiloxane in hydrocarbon solvent is added in an amount such that there is at least one molecule of cyclotrisiloxane per lithium atom or the total amount of cyclotrisiloxane hydrocarbons solvent can be added. If less than the total amount of cyclotrisiloxane solution is added, the reaction is allowed to take place for at least 30 minutes or until the color has disappeared and then the remainder of the cyclotrisiloxane solution is added, keeping the reaction conditions approximately the same.

The preparation of the mixture of cyclotrisiloxane in hydrocarbon solvent and its addition to the ether solution of the lithium terminated polymer is carried out without exposure to oxygen, water or acidic materials. The cyclotrisiloxane has a formula $(R^2R^3SiO)_3$ in which $R^2$ and each $R^3$ are alkyl radicals, alkenyl radicals, aryl radicals or beta-perfluoroalkylethyl radicals. Illustrative of $R^2$ and $R^3$ are alkyl radicals such as, methyl, ethyl, propyl, isopropyl, octyl, octadecyl and myricyl, alkenyl radicals, such as vinyl, allyl and hexenyl, aryl radicals such as, phenyl, tolyl, xylyl, xenyl, naphthyl, anthracyl, benzyl, beta-phenylethyl, beta-phenylpropyl and gamma-tolylpropyl, and beta-perfluoroalkyl ethyl radicals where the perfluoroalkyl radical can be for example, trifluoromethyl, perfluoroethyl, perfluoroisobutyl and perfluorooctadecyl. Examples of cyclotrisiloxanes are hexamethyl-cyclotrisiloxane, $\{(CH_3)(CH_2=CH)SiO\}_3$, $\{(CH_3)(C_6H_5)SiO\}_3$, $\{(CH_3)(CF_3CH_2CH_2)SiO\}_3$ and the like.

The hydrocarbon solvents include among others, benzene, toluene, cyclohexane, n-hexane, mineral spirits, methylcyclohexane, xylene, n-butane, n-heptane, isooctane and cyclopentane. The hydrocarbon solvent and the cyclotrisiloxane are mixed to provide solutions of at least 50 weight percent hydrocarbon solvent, preferably at least 60 weight percent hydrocarbon solvent.

After the hydrocarbon solvent solution of the cyclotrisiloxane is mixed with the lithium terminated polymer, the temperature is maintained above −40° C. and no greater than the reflux temperature of the mixture for at least 30 minutes and until the color of the mixture disappears and the cyclotrisiloxane has polymerized preferably 3 to 4 hours. The resulting product has the following formula R [ $CH_2C(CH_3)(C_6H_5)$ ]$_x$ [ $CH_2CH(C_6H_5)$ ]$_b$ $(R^2R^3SiO)_e$Li when $a$ is 1 and the following formula Li(OSiR$^2$R$^3$)$_f$ { CH(C$_6$H$_5$)CH$_2$ ]$_c$ [ C(C$_6$H$_5$)(CH$_3$)CH$_2$ ]$_g$R - -
[ $CH_2C(CH_3)(C_6H_5)$ ]$_z$ [ $CH_2CH(C_6H_5)$ ]$_d$(R$^2$R$^3$SiO)$_g$Li when $a$ is 2. R, $R^2$, $R^3$, $x$, $y$, $z$, $b$, $c$ and $d$ are defined above and $e$ has a value from 20 to 5,000 and the sum of $f$ and $g$ has a value from 20 to 5,000.

In the polymerization process for the cyclotrisiloxane, it is sometimes preferably to have a promoter solvent present to accelerate the polymerization. The promoter solvents can be among others, tetrahydrofuran, bis(2-methoxyethyl) ether, $CH_3O(CH_2CH_2O)_2CH_3$ and the like. The amount of promoter solvent used is preferably at least one weight percent based on the weight of the mixture.

The above lithium ended block copolymers can be terminated with hydroxyl radicals by replacing the lithium atoms with hydrogen atoms by adding acetic acid or can be terminated by siloxy groups of the formula ZR$_2^4$Si— where Z and R$^4$ are each selected from R$^2$, R$^3$ or hydrolyzable radicals by adding ZR$_2^4$SiCl to the lithium terminated block copolymer. The amount of acetic acid or ZR$_2^4$SiCl is sufficient to provide at least one molecule per lithium atom. The hydrolyzable groups can be illustrated by halogen, alkoxy, such as methoxy, ethoxy, isopropoxy, hexoxy, octadecoxy, —O(CH$_2$CH$_2$O)$_2$CH$_3$, by acyloxy such as acetoxy, —OOCCH$_2$CH$_3$, amino such as dimethylamino and methyl-phenylamine, ketoxime such as methylethylketoxime, dimethylketoxime and phenylmethylketoxime, and the like.

After the block copolymer is terminated with the desirable end groups, it is recovered from the solvent mixture by any of a number of conventional ways such as by solvent evaporation and washing, by selective solvent precipitation and washing and the like.

The molecular weight of the resulting block copolymer should be greater than 7,000 and from 5 to 95 weight percent silicon containing units and 5 to 95 weight percent of the organic block. These block copolymers are useful as dispersants to disperse polyorganosiloxanes in poly-alpha-methylstyrene. They can be coupled to provide higher molecular weight polymers which exhibit elastomeric and thermoplastic properties which are film formers.

The method of the present invention provides an excellent procedure for making block copolymers between polydiorganosiloxanes and poly-alpha-methylstyrene wherein the interfering depolymerization of poly-alpha-methylstyrene is for all practical purposes eliminated.

The following example is illustrative only and should not be construed as limiting the present invention which is properly delineated in the claims.

EXAMPLE

The following procedures were carried out by removing any water acidic materials, oxygen and inhibitors from the ingredients. A solution of 0.012 moles of dilithiostilbene in 20 ml. of tetrahydrofuran was added to a solution of 40 g. of alpha-methylstyrene in 500 ml. of tetrahydrofuran. The resulting solution was cooled to −70° C. and held at this temperature for 30 minutes during which time the alpha-methylstyrene was polymerized. To the resulting mixture, 4.55 g. of styrene was added. After 5 minutes, the styrene had polymerized. Thereafter, the mixture was allowed to warm to ambient temperature. No alpha-methylstyrene monomer was detected in the warmed mixture. To the warmed mixture, 140 g. of hexamethylcyclotrisiloxane in 515 ml. of benzene was added. After 4 hours 95 percent of hexamethylcyclotrisiloxane was consumed. The polymerization was terminated with the addition of 5 ml. of acetic acid. The mixture was thereafter washed with 100 ml. of a 20 weight percent solution of sodium bicarbonate in water. The solution was washed with water until neutral and the block copolymer was then precipitated by adding the solution to 3,000 ml. of ethanol. The precipitated polymer was washed twice with ethanol and then dried at 40° C. and 1 mm of Hg for 24 hours. 156 g. of the block copolymer was recovered having 83 weight percent polydimethylsiloxane block by silicon analysis and 17 weight percent polyalpha-methylstyrene-styrene block. No free polydimethylsiloxane was found in the block copolymer.

To 50 g. of the above block copolymer in 500 ml. of cyclohexane, 0.5 ml. of stannous octoate was added. The solvent was removed and the resulting polymer was heated at 140° C. at 1 mm of Hg for 24 hours. The product was cooled, dissolved in 500 ml. of toluene and then precipitated by adding the toluene solution to 2,000 ml. of ethanol. The precipitated block copolymer was washed with ethanol and then dried at 40°C. at 1 mm of Hg for 24 hours. The product was a transparent elastomer.

That which is claimed is:

1. A method for preparing a block copolymer consisting essentially of at least one block of a poly-alpha-methylstyrene and at least one block of a polydiorganosiloxane consisting essentially of (A) mixing under conditions excluding oxygen, water and acidic materials at a temperature below −40° C. and above the freezing point of an ether solution of (1) alpha-methylstyrene and (2) an organolithium compound of the formula RLi$_a$ in which R is a radical selected from the group consisting of monovalent hydrocarbon radicals having from 1 to 30 inclusive carbon atoms and divalent hydrocarbon radicals both having from 2 to 30 inclusive carbon atoms and $a$ being 1 when R is monovalent and 2 when R is divalent, said mixing of (1) and (2) being in the presence of at least 70 weight percent organic ether solvent based on the total weight of the solution, (B) maintaining the resulting mixture of (A) at a temperature below −40° C. and above the freezing point temperature until the alpha-methylstyrene has polymerized, (C) adding to the polymerized alpha-methylstyrene formed in (B) from 0.05 to 0.25 times the moles of alpha-methyl-styrene of styrene while maintaining the temperature below −40° C. and above the freezing point temperature of the solution until the styrene has polymerized, thereafter (D) increasing the temperature to a temperature above −40° C. and below the boiling point temperature of the solution, (E) mixing under conditions excluding oxygen, water and acidic materials, (3) a cyclotrisiloxane of the formula $(R^2R^3SiO)_3$ in which each $R^2$ and each $R^3$ is selected from the group consisting of an alkyl radical, an alkenyl radical, an aryl radical and a beta-perfluoroalkylethyl radical and (4) a hydrocarbon solvent wherein the hydrocarbon solvent is present in sufficient quantity to provide a mixture of at least 50 weight percent of (4) based on the total weight of (3) and (4), (F) adding the mixture from (E) to the resulting product from (D) without exposing any of the mixture to oxygen, water or acidic materials, (G) maintaining the resulting mixture from (F) at a temperature above −40° C. and no greater than the reflux temperature of the mixture for at least 30 minutes and until the color of the mixture disappears and the cyclotrisiloxane has polymerized, thereafter, (H) adding a compound selected from the group consisting of acetic acid and $ZR_2^4SiCl$ wherein each $R^4$ and each Z is a monovalent radical defined by $R^2$, $R^3$, or hydrolyzable radical in an amount sufficient to provide at least one molecule of compound per lithium atom of the mixture, (I) recovering a block copolymer containing at least one organic block of $-CH_2-C(CH_3)(C_6H_5)-$ units linked together and having bonded to at least one end of the linked $-CH_2C(CH_3)(C_6H_5)-$ units, units of $-CH_2CH(C_6H_5)-$ linked together and not more than one end being terminated by R— groups defined above and at least one polydiorganosiloxane block of $-R^2R^3SiO-$ units linked together through silicon-oxygen-silicon bonds and said polydiorganosiloxane being bonded to the $-CH_2CH(C_6H_5)-$ units of the organic block through a silicon-carbon bond and any terminal groups on the polydiorganosiloxane block being selected from the group consisting of a hydroxyl radical and a-$SiR_2^4Z$ radical, there being in said block copolymer an average of from 20 to 5,000 $-CH_2-C(CH_3)(C_6H_5)-$ units per organic block, an average from 1 to 1250 $-CH_2CH(C_6H_5)-$ units per organic block and an average of from 20 to 5,000 $-R^2R^3SiO-$ units per polydiorganosiloxane block and said block copolymer having a molecular weight above 7,000 and from 5 to 95 weight percent being silicon containing units and 5 to 95 weight percent being units of the organic block.

* * * * *